US012681434B2

(12) United States Patent
Winkler

(10) Patent No.: US 12,681,434 B2
(45) Date of Patent: Jul. 14, 2026

(54) OSCILLATING WINDING MASS PROVIDED WITH A ROTATING DECORATIVE ELEMENT FOR AUTOMATIC MOVEMENT OF A TIMEPIECE

(71) Applicant: The Swatch Group Research and Development Ltd, Marin (CH)

(72) Inventor: Yves Winkler, Schmitten (CH)

(73) Assignee: The Swatch Group Research and Development Ltd, Marin (CH)

( * ) Notice: Subject to any disclaimer, the term of this patent is extended or adjusted under 35 U.S.C. 154(b) by 400 days.

(21) Appl. No.: 17/798,724

(22) PCT Filed: Jan. 18, 2021

(86) PCT No.: PCT/EP2021/050898
§ 371 (c)(1),
(2) Date: Aug. 10, 2022

(87) PCT Pub. No.: WO2021/164965
PCT Pub. Date: Aug. 26, 2021

(65) Prior Publication Data

US 2023/0082088 A1 Mar. 16, 2023

(30) Foreign Application Priority Data

Feb. 17, 2020 (EP) .................................... 20157748

(51) Int. Cl.
*G04B 5/16* (2006.01)
*G04B 45/00* (2006.01)

(52) U.S. Cl.
CPC ......... *G04B 5/165* (2013.01); *G04B 45/0046* (2013.01)

(58) Field of Classification Search
CPC .................... Y10T 29/49705; Y10T 29/49707
See application file for complete search history.

(56) References Cited

U.S. PATENT DOCUMENTS 6,354,731 B1 * 3/2002 Halter ...................... G04B 5/18 368/169
2010/0254227 A1 * 10/2010 Kamiya ................ G04F 7/0814 368/101
(Continued)

FOREIGN PATENT DOCUMENTS

CH 317534 A 11/1956
EP 3 035 130 A1 6/2016
(Continued)

OTHER PUBLICATIONS

Synthetic Sapphire (Ruby) Balls, Dejay Distribution (Year: 2019).*
(Continued)

*Primary Examiner* — Renee S Luebke
*Assistant Examiner* — Matthew Daniel Hwang
(74) *Attorney, Agent, or Firm* — Sughrue Mion, PLLC

(57) ABSTRACT

An oscillating winding mass (1) for a movement of a timepiece, the oscillating winding mass (1) being intended to be rotatably mounted on an axis of the movement. The winding mass includes a main element (2) and a decorative element (10), for example a logo or an acronym, a part of the winding mass (1) forming a heavy part (3) allowing the oscillation of the mass (1) in response to the movement of the timepiece and to the force of gravity, the main element (2) giving the general shape of the oscillating winding mass (1), the decorative element (10) being mechanically linked to the main element (2), the decorative element (10) being rotatably mounted on the main element (2).

10 Claims, 1 Drawing Sheet

(56) References Cited

U.S. PATENT DOCUMENTS

| | | | | |
|---|---|---|---|---|
| 2012/0243387 A1* | 9/2012 | Jamin | G04B 5/16 368/208 |
| 2013/0212856 A1* | 8/2013 | Winkler | B21J 5/00 29/428 |
| 2017/0268111 A1* | 9/2017 | Manasterski | G04B 13/02 |

FOREIGN PATENT DOCUMENTS

| | | |
|---|---|---|
| JP | 2009-186394 A | 8/2009 |
| WO | 2013/141493 A1 | 9/2013 |

OTHER PUBLICATIONS

Translation of WO2013141493, Google Patents (Year: 2013).*
International Search Report for PCT/EP2021/050898 dated Apr. 13, 2021.

* cited by examiner

OSCILLATING WINDING MASS PROVIDED WITH A ROTATING DECORATIVE ELEMENT FOR AUTOMATIC MOVEMENT OF A TIMEPIECE

CROSS REFERENCE TO RELATED APPLICATION

This application is a National Stage of International Application No. PCT/EP2021/050898 filed Jan. 18, 2021, claiming priority based on European Patent Application No. 20157748.3 filed Feb. 17, 2020.

FIELD OF THE INVENTION

The present invention relates to an oscillating winding mass provided with a rotating element for the automatic movement of a timepiece. More particularly, the invention relates to such a winding mass intended to equip a wristwatch including a transparent back. The invention also relates to a timepiece provided with such an oscillating winding mass.

BACKGROUND OF THE INVENTION

Wristwatches having cases with a transparent back to allow observation of their movement are already known. However, when these watches include a self-winding movement, the oscillating winding mass hides a movement part.

Furthermore, the aesthetics of such oscillating masses are not always pleasant, even if it is possible to engrave the material forming the oscillating mass to make it more attractive. It is possible, for example, to engrave a decorative element, such as a logo representing the brand of the watch. But this logo is generally not visible enough for the result to be aesthetically convincing. Furthermore, simply colouring the logo is not enough to make the mass more aesthetic, not to mention that the colour can degrade over time. In addition, the decorative element is static with respect to the rest of the oscillating mass.

SUMMARY OF THE INVENTION

The object of the present invention is to overcome the disadvantages of the prior art by proposing an oscillating winding mass for a timepiece including a particular decorative element.

To this end, the object of the invention is an oscillating winding mass for a movement of a timepiece, said oscillating winding mass being intended to be rotatably mounted on an axis of the movement.

The invention is remarkable in that it comprises a main element and a decorative element, for example a logo or an acronym, a part of the winding mass forming a heavy part allowing the oscillation of the mass in response to the movement of the timepiece and to the force of gravity, the main element giving the general shape of the oscillating winding mass, the decorative element being mechanically linked to the main element, the decorative element being rotatably mounted on the main element.

Thanks to this new winding mass structure, a decorative element is rotatably connected to the main element of the winding mass. Thus, the winding mass has a more attractive aesthetic result than a conventional winding mass known from the prior art. Indeed, the rotating decorative element, which can represent a brand logo or acronym, gives more cachet to the winding mass and therefore to the timepiece.

The main element and the decorative element can rotate together at different speeds, or the decorative element can rotate when the main element has just stopped. Thus, the rotation of the decorative element relative to the main element provides a particular aesthetic effect.

According to a particular embodiment of the invention, the heavy part is formed by at least a part of the main element.

According to a particular embodiment of the invention, the mass comprises a ball bearing to allow the decorative element to rotate.

According to a particular embodiment of the invention, the ball bearing is arranged on the main element.

According to a particular embodiment of the invention, the main element includes an opening wherein the decorative element is arranged.

According to a particular embodiment of the invention, the ball bearing is disposed in an internal face of the opening.

According to a particular embodiment of the invention, the balls are disposed in the mass of the main element.

According to a particular embodiment of the invention, the balls are distributed angularly in the internal face of the opening.

According to a particular embodiment of the invention, each ball is retained in a housing whose dimensions allow the ball to rotate while being retained in a substantially predefined position.

According to a particular embodiment of the invention, the housing comprises an orifice emerging into the opening, so that part of the ball protrudes from the housing into the opening so as to be able to be in contact with the decorative element.

According to a particular embodiment of the invention, the decorative element comprises a portion intended to be in contact with the balls of the bearing.

According to a particular embodiment of the invention, the decorative element comprises, preferably entirely, ceramic.

According to a particular embodiment of the invention, the main element comprises amorphous metal.

According to a particular embodiment of the invention, the internal face of the opening includes rails for retaining the decorative element in the opening, the portion of the decorative element preferably being bevelled.

The invention also relates to a timepiece including a case formed of a middle part closed by a crystal and an at least partially transparent back and wherein is housed a self-winding timepiece movement, said movement being equipped with an oscillating winding mass as defined above.

BRIEF DESCRIPTION OF THE DRAWINGS

Other details of the invention will appear more clearly upon reading the following description, made with reference to the appended drawings wherein.

DETAILED DESCRIPTION OF A PREFERRED EMBODIMENT

Figure 1:
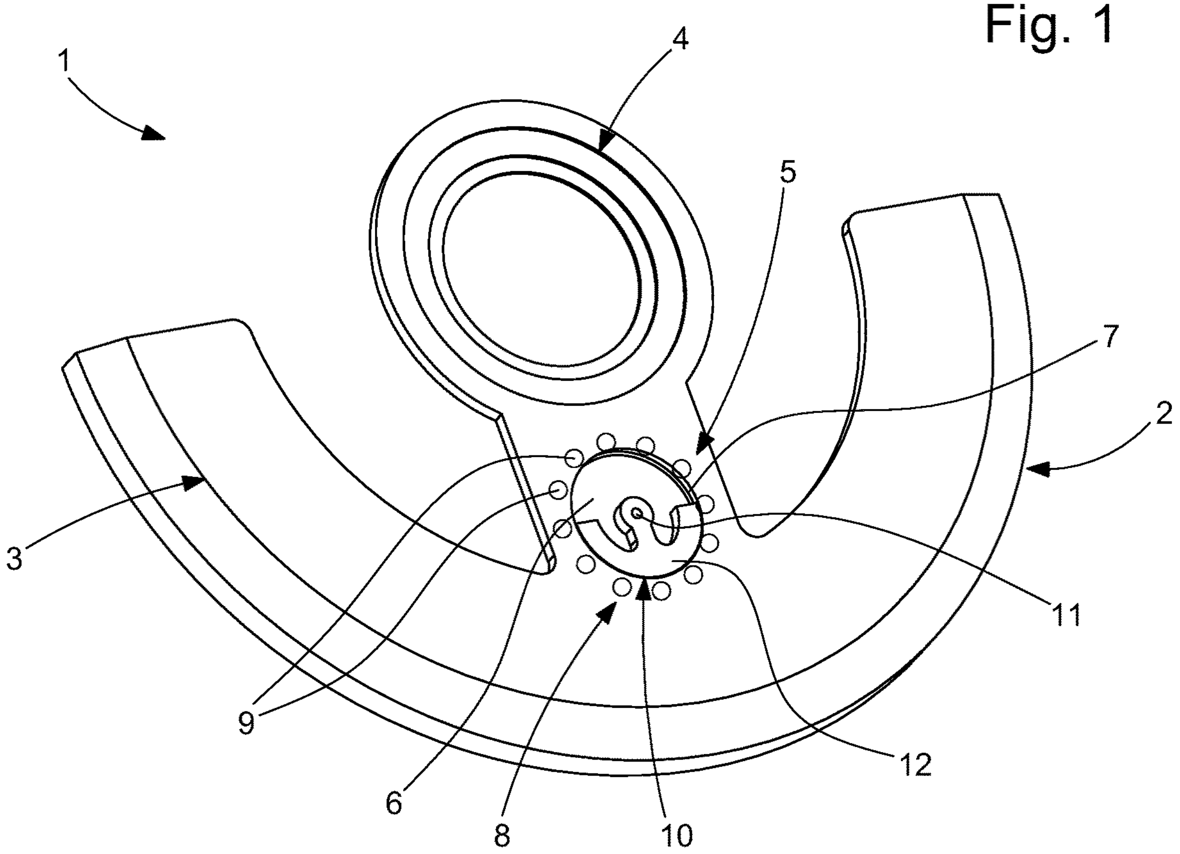
FIG. 1 is a perspective view of an embodiment of an oscillating winding mass according to the invention.
Figure 2:
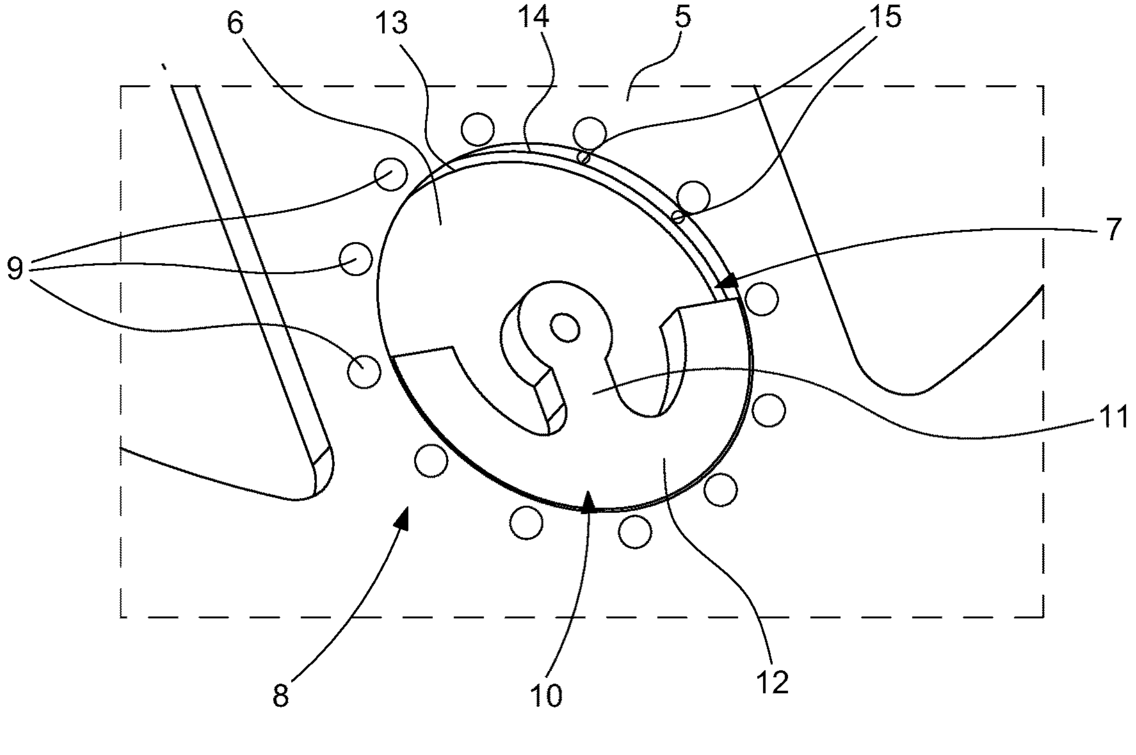
FIG. 2 is an enlargement of the wall of the oscillating mass, the decorative element and the ball bearing.

FIG. 1 shows an embodiment of an oscillating winding mass according to the invention, designated by the general reference 1. This mass 1 is intended to conventionally equip the self-winding movement of a timepiece, the piece including in particular a case formed of a middle part closed by a crystal and an at least partially transparent back to make the movement visible from the back, and which are not shown in the figures.

The winding mass 1 comprises a main element 2 giving the general shape of the oscillating winding mass 1. The main element 2 comprises a heavy part 3 and a connecting member 5 intended to connect the heavy part 3 to an axis (not shown in the figures) integral with a horological movement, the mass 1 being intended to be rotatably mounted on this axis. The heavy part 3 allows the oscillation of the mass 1 in response to the movement of the timepiece and to the force of gravity.

The connecting member comprises a substantially circular ring 4 and a substantially flat wall 5 connecting the ring 4 to the heavy part 3 of the mass 1. The ring 4 is intended to be arranged on the axis of the movement. Thus, the oscillating mass 1 performs a circular movement around the axis, when it oscillates. The heavy part 3, as well as the ring 4 and the wall 5 of the connecting member are arranged substantially in the same plane.

The heavy part 3 has the shape of an arc of a circle forming an angle substantially equal to 180°. The wall 5 is connected to the heavy part 3, substantially in the middle of the arc of a circle, on the internal side of the curvature. The ring 4 is arranged at the other end of the wall 5.

According to the invention, the winding mass 1 comprises a decorative element 10, for example a logo or acronym, the decorative element 10 being mechanically linked to the main element 2 of the mass 1. The decorative element 10 is here a logo in the shape of an anchor having a substantially straight segment 11 and a curved segment 12, the straight segment 11 being connected to the curved segment 12 in its middle, on the internal side of the curvature.

The main element 2 includes an opening 6 wherein the decorative element 10 is arranged. The opening 6 is made in the wall 5 of the connecting member in the plane of the wall 5. The decorative element is disposed in the same plane as the opening 6 and the wall 5. Preferably, the opening 6 passes through the wall 5 of the main element 2. The opening 6 here has a circular shape provided with a centre of the circle. The opening 6 is bordered by an internal face 7 defining the outline of the opening 6. The internal face 7 has a cylindrical shape, the height of which corresponds to the thickness of the wall 5.

The decorative element 10 is rotatably mounted on the main element 2. To this end, the winding mass 1 comprises a ball 9 bearing 8.

In a first embodiment, shown in the figures, the ball 9 bearing 8 is arranged on the main element 2 to allow the decorative element 10 to rotate by sliding on the balls 9. The ball 9 bearing 8 is arranged in the opening 6, in the internal face 7. The decorative element 10 can then rotate around an axis passing substantially through the centre of the opening 6.

The balls 9 are distributed angularly in the internal face 7 of the opening 6. The balls 9 are disposed in the mass of the main element 2. In FIG. 1, the bearing comprises twelve balls 9. Each ball 9 is retained in a housing whose dimensions correspond substantially to those of the ball 9, so as to allow it to rotate inside. For this purpose, the housing is generally spherical with a diameter slightly greater than that of the ball 9. Thus, the housing is configured to retain the ball 9 while leaving it a dimension clearance allowing it to rotate inside the housing.

Each housing further comprises an orifice 15 emerging into the opening 6. The orifices 15 are arranged on the internal face 7 of the opening 6. Thus, the ball 9 protrudes from the housing into the opening 6 and can be in contact with the decorative element 10.

The decorative element 10 comprises a portion intended to be in contact with the balls 9 of the bearing 8. In the example of the anchor, this is the external face of the curved segment 12 which slides on the balls 9 of the bearing 8.

To retain the decorative element 10 in the opening 6, the internal face 7 of the opening 6 includes rails 13, 14 for retaining the decorative element 10. Two rails 13, 14 are each disposed substantially on an edge of the cylinder defined by the internal face 7.

The contact portion of the decorative element preferably has a bevelled shape to be able to be introduced and retained between the two rails 13, 14. Thus, the decorative element 10 can slide against the balls 9, while remaining retained in the opening 6 by the rails 13, 14.

The balls 9 are for example formed of a poly-crystal type synthetic ruby material.

The decorative element 10 is formed of a material, which is preferably opaque, to be distinguished from the main element 2. The material of the decorative element 10 comprises, preferably entirely, ceramic such as zirconia of the $ZrO_2$ type. This material allows to obtain particular colours, for example black, to be clearly visible.

In a first variant embodiment, the main element 2 is formed from a one-piece amorphous metal material with a high density greater than 10 g/cm$^3$, such as an amorphous platinum alloy of the Pt85CuNiP type with a density of 15.4 g/cm$^3$. Thus, the heavy part 3 is formed of the same material. The high-density material gives sufficient inertia to the heavy part 3.

In a second variant embodiment, the main element 2 is partly formed of an amorphous metal with a low density of less than 10 g/cm$^3$, such as an amorphous zirconium alloy of the ZrVit106a type with a density of 6.7 g/cm$^3$. The heavy part 3 is a separate element assembled to the main element 2. The heavy part 3 is made of a high-density material, preferably greater than 10 g/cm$^3$, for example tungsten or a tungsten alloy with a density of 19.3 g/cm$^3$.

To form the balls 9 and the housings in the wall 5, a method is used wherein the ruby balls are first formed, which are covered with a metal layer, for example copper, deposited by galvanic growth. The metallised balls 9 are then embedded in the amorphous metal mass of the main element 2 during its formation, and finally the metal layer is dissolved by a chemical technique. The dissolution of the layer frees the ball from the material of the main element, and allows it to rotate in the housing, while being retained therein. For example, use is made of an overmoulding method, such as hot forming or the injection of amorphous metal. Such a production method is described in patent EP 2 585 238, in particular in paragraphs [0044] and [0045].

In a second embodiment, not shown in the figures, the ball bearing is arranged in the decorative element. To this end, the decorative element is formed of an amorphous metal material to be able to form the balls in the same way as in the first embodiment, but in the decorative element this time. The main element is preferably formed of another material allowing sufficient inertia to be obtained.

In a third embodiment, not shown in the figures, the ball bearing is an additional element attached to the internal face of the opening. Thus, the balls are not embedded in the material of the additional element, but are part of the additional element. The additional element is fixed to the inner side of the opening. The decorative element is retained by the additional element while being able to rotate thanks to the ball bearing, as in the embodiment of FIG. 1, described previously.

The invention claimed is:

1. An oscillating winding mass (1) for a movement of a timepiece, said oscillating winding mass (1) being intended to be rotatably mounted on an axis of the movement, comprising a main element (2) and a decorative element (10), a part of the winding mass (1) forming a heavy part (3) allowing the oscillation of the mass (1) in response to the movement of the timepiece and to the force of gravity, the decorative element (10) being mechanically linked to the main element (2), the decorative element (10) being rotatably mounted on the main element (2) by a ball bearing (8) of the main element (2) to allow the decorative element (10) to rotate with contact of a portion of the decorative element (10) along balls (9) of the ball bearing (8) within the main element (2), the main element (2) including an opening (6) wherein the decorative element (10) is arranged, the main element (2) being made of amorphous metal, wherein the ball bearing (8) is arranged on the main element (2), wherein the ball bearing (8) is disposed in an internal face (7) of the opening (6), wherein the internal face (7) of the opening (6) includes rails (13, 14) for retaining the decorative element (10) in the opening (6), and the rails (13, 14) are circular, wherein the main element (2) overall and the decorative element (10), overall and within the opening (6) of the main element (2), both comprise anchor shapes, with the decorative element (10) being a smaller anchor shape than that of the main element (2), the anchor shapes, of both the main element (2) and the decorative element (10), comprise a neck and an arc, the neck being attached to the arc at an inner circumferential center of the arc, the neck being shaped as a straight segment (11), and the arc being shaped as a curved segment (12), and the arc and the neck of the smaller anchor shape of the decorative element (10) occupy less than half of a total space of the opening (6), and an end of the neck of the smaller anchor shape of the decorative element (10) is centered in the opening (6).

2. The winding mass (1) according to claim 1, wherein the balls (9) are distributed angularly in the internal face (7) of the opening (6).

3. The winding mass (1) according to claim 2, wherein the balls (8) are disposed in the mass of the main element (2).

4. The winding mass (1) according to claim 3, wherein the ball bearing (8) comprises balls (9) of which each ball (9), of the ball bearing (8), is retained in a housing whose dimensions allow each ball (9) to rotate while being retained in a substantially predefined position.

5. The winding mass (1) according to claim 4, wherein the housing comprises an orifice (15) emerging into the opening (6), so that part of each of the balls (9) protrudes from the housing into the opening (6) so as to be able to be in contact with the decorative element (10).

6. The winding mass (1) according to claim 1, wherein the ball bearing (8) comprises balls (9) that are made of ruby.

7. The winding mass (1) according to claim 1, wherein the decorative element (10) comprises a portion configured to contact balls (9) of the ball bearing (8).

8. The winding mass (1) according to claim 1, wherein the decorative element (10) comprises, entirely, ceramic.

9. A timepiece including a case formed of a middle part closed by a crystal and an at least partially transparent back and wherein is housed a self-winding timepiece movement, wherein said movement is equipped with the oscillating winding mass (1) according to claim 1.

10. A method for manufacturing a winding mass according to claim 1, the method comprising the following steps:

a first step wherein ruby balls (9), the ruby balls (9) being balls (9) of the ball bearing (8), are formed, a second step wherein the balls (9) are covered with a metal layer, a third step wherein the balls (9) are embedded in an amorphous metal mass of the main element (2), a fourth step wherein the metal layer is dissolved by a chemical technique to obtain the ball bearing (8).

* * * * *